(12) United States Patent
Emanule Ceron et al.

(10) Patent No.: US 12,435,881 B2
(45) Date of Patent: Oct. 7, 2025

(54) HEALTHY OVEN ACCESSORY

(71) Applicant: WHIRLPOOL CORPORATION, Benton Harbor, MI (US)

(72) Inventors: Simone Emanule Ceron, Biandronno (IT); Nicoletta Giovanna Sinelli, Biandronno (IT); Luca Distaso, Biandronno (IT)

(73) Assignee: Whirlpool Corporation, Benton Harbor, MI (US)

( * ) Notice: Subject to any disclaimer, the term of this patent is extended or adjusted under 35 U.S.C. 154(b) by 499 days.

(21) Appl. No.: 17/945,578

(22) Filed: Sep. 15, 2022

(65) Prior Publication Data

US 2024/0093879 A1    Mar. 21, 2024

(51) Int. Cl.
*F24C 15/16* (2006.01)

(52) U.S. Cl.
CPC .................. *F24C 15/16* (2013.01)

(58) Field of Classification Search
CPC ...... F24C 15/16; F24C 15/162; F24C 15/164; F24C 15/166; F24C 15/168; A47J 37/0694; H05B 6/6408
USPC ........ 126/332, 337 R, 338, 339, 340, 337 A, 126/334, 335, 333
See application file for complete search history.

(56) References Cited

U.S. PATENT DOCUMENTS

| | | | |
|---|---|---|---|
| 5,232,609 A | 8/1993 | Prevost et al. | |
| 8,857,652 B2 | 10/2014 | Lewis et al. | |
| 2005/0145623 A1* | 7/2005 | Pool, III | F24C 15/16 219/730 |
| 2006/0027104 A1* | 2/2006 | Perez, Jr. | A21B 3/137 99/426 |
| 2017/0030588 A1 | 2/2017 | Unwin et al. | |
| 2021/0274968 A1* | 9/2021 | Steiner | A47J 37/0676 |
| 2023/0027208 A1* | 1/2023 | Barber | A47J 37/0694 |

FOREIGN PATENT DOCUMENTS

KR    200347916 Y1 *  4/2004

* cited by examiner

*Primary Examiner* — Steven B McAllister
*Assistant Examiner* — Xiaoting Hu
(74) *Attorney, Agent, or Firm* — Brooks Kushman, P.C.

(57) ABSTRACT

An accessory for an oven may include a frame configured to engage with each side of the oven during use, the frame forming a pair of side supports spaced and parallel to one another and each of the pair of side supports configured to engage with a rail of the oven on the respective side of the oven, and a pair of mesh supports spaced and parallel to one another and each of the pair of mesh supports extending between the side supports, and a mesh attached to the mesh supports and including a plurality of hinged panels configured to hinge with respect to the next panel in response to a container being placed on the mesh to allow the mesh to conform to the shape of the container.

20 Claims, 7 Drawing Sheets

HEALTHY OVEN ACCESSORY

TECHNICAL FIELD

Disclosed herein are oven accessories, and in particular flexible oven racks supporting healthy cooking methods.

BACKGROUND

Cooking appliances, such as convection ovens, often have adjustable racks, allowing the user to change the location and relative height of a rack within the oven cavity, as well as to remove the rack and replace the rack. The racks are configured to support cooking articles and/or food items thereon, for example, to allow for positioning of the articles and/or items within the appliance during cooking. The racks are repositionable to provide the desired positioning relative to operative elements (such as burners or the like.) Some racks are slidably supported to be extendable partially out of the appliance cavity for easier insertion and removal of the related cooking articles and food items. With healthy cooking becoming more and more prevalent, consumers are interested in cooking appliances and accessories that may allow for healthy cooking methods.

SUMMARY

An accessory for an oven may include a frame configured to engage with each side of the oven during use, the frame forming a pair of side supports spaced and parallel to one another and each of the pair of side supports configured to engage with a rail of the oven on the respective side of the oven, and a pair of mesh supports spaced and parallel to one another and each of the pair of mesh supports extending between the side supports, and a mesh attached to the mesh supports and including a plurality of hinged panels configured to hinge with respect to the next panel in response to a container being placed on the mesh to allow the mesh to conform to the shape of the container.

In one embodiment, the mesh supports define a bend at each end to vertically offset the mesh supports from the side supports.

In another example, the mesh forms a quadratic shape having four sides.

In another embodiment, a pair of bars each extend from one of the mesh supports to the other to support the mesh at two sides of the mesh while the mesh supports support the mesh at the other two sides of the mesh.

In one embodiment, the bars extend between the mesh supports at the bend at each end of the mesh supports.

In another example, each of the panels form a quadratic shape and include a channel on one side and a rod on the opposite side, where the channel of one panel is configured to receive the rod of an adjacent panel, the rod configured to rotate within the channel to allow the one panel to hinge with respect to the adjacent panel.

In another embodiment, the mesh includes a plurality of intertwining wires forming a rhomboid mesh forming a plurality of rhomboid openings between the wires.

In one embodiment, each of the panels form a quadratic shape configured to fit within the rhomboid openings and include at least one channel configured to engage with a portion of the wire to secure the panel to the wire.

In another example, each of the panels include at least one prong configured to engage with the wire to secure the panel to the wire.

In another embodiment, each of the panels include a pair of prongs on opposite sides of the panel and a pair of channels on the other of the sides, each channel defining an opening configured to receive the prong of the adjacent panel such that the panel and the adjacent panel each engage the same portion of wire.

An accessory for a cooking appliance may include a frame configured to engage with each side of the cooking appliance during use, the frame forming a pair of side supports spaced and parallel to one another and each of the pair of side supports configured to engage with a rail of the cooking appliance on the respective side of the oven, and a pair of mesh supports spaced and parallel to one another and each of the pair of mesh supports extending between the side supports, and a mesh attached to the mesh supports and configured to flexibly conform to a shape of a container placed thereon.

In one embodiment, the mesh includes a plurality of wires intertwined to form rhomboid openings between the wires.

In another example, a plurality of panels are configured to be received within the rhomboid openings.

In another embodiment, the panels are formed of silicone or any other flexible material able to resist stress and temperatures into cooking cavities.

In one embodiment, the panels form a quadratic shape to mimic the rhomboid openings, where one pair of opposite sides include prongs configured to engage the wire in an installed state.

In another example, the other pair of opposite sides of the panels include a channel having an opening, where the channel is configured to engage the another portion of wire in the installed state, where the opening is configured to receive the prong of an adjacent panel such that the panel and the adjacent panel engage the same portion of the wire.

In one embodiment, the mesh supports define a bend at each end to vertically offset the mesh supports from the side supports.

In another example, the mesh forms a quadratic shape having four sides.

In another embodiment, a pair of bars each extend from one of the mesh supports to the other to support the mesh at two sides of the mesh while the mesh supports support the mesh at the other two sides of the mesh.

In one embodiment, the mesh includes a plurality of hinged panels configured to hinge with respect to the next panel, each of the panels forming a quadratic shape and include a channel on one side and a rod on the opposite side, where the channel of one panel is configured to receive the rod of an adjacent panel, the rod configured to rotate within the channel to allow the one panel to hinge with respect to the adjacent panel.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Consumers are showing more and more attention to healthy lifestyles, which includes healthy cooking. Small appliances dedicated to healthy cooking are becoming more and more preferable to consumers such as air fryers, sous vide, etc. These appliances may be more convenient than traditional kitchen appliances, but still take up a larger amount of space. Built in ovens may have various features similar to those of an air fryer, including steam functions, etc. However, each of these may require a specific accessory to perform the specific intended function.

Disclosed herein is an oven having an accessory that allows cooking in various ways without requiring multiple accessories. The oven may include a rack configured to perform multiple cooking techniques, such as dehydration, steam, sous vide, high speed, slow cooking, etc. This rack may include a mesh configured to replace the traditional tray within the oven. The mesh may be configured to receive a container and conform to the shape of the container, such as a jar, or package of meat, etc. The mesh may extend between two supports, the supports configured to be received at each side of the oven on the oven rails. The mesh is made up of a plurality of panels connected and hinged to the next panel such that the panels are configured to hinge and deform in response to a container being placed thereon.

The rack allows cooking of various foods in various ways, from an air frying function to a low cooking temperature. When packaged, this rack takes less space when not in use compared to standard backing trays and racks currently in use. Thanks to the mesh returning flat when not in use, these types of racks can be eventually packed and stored using less space.

Figure 1:
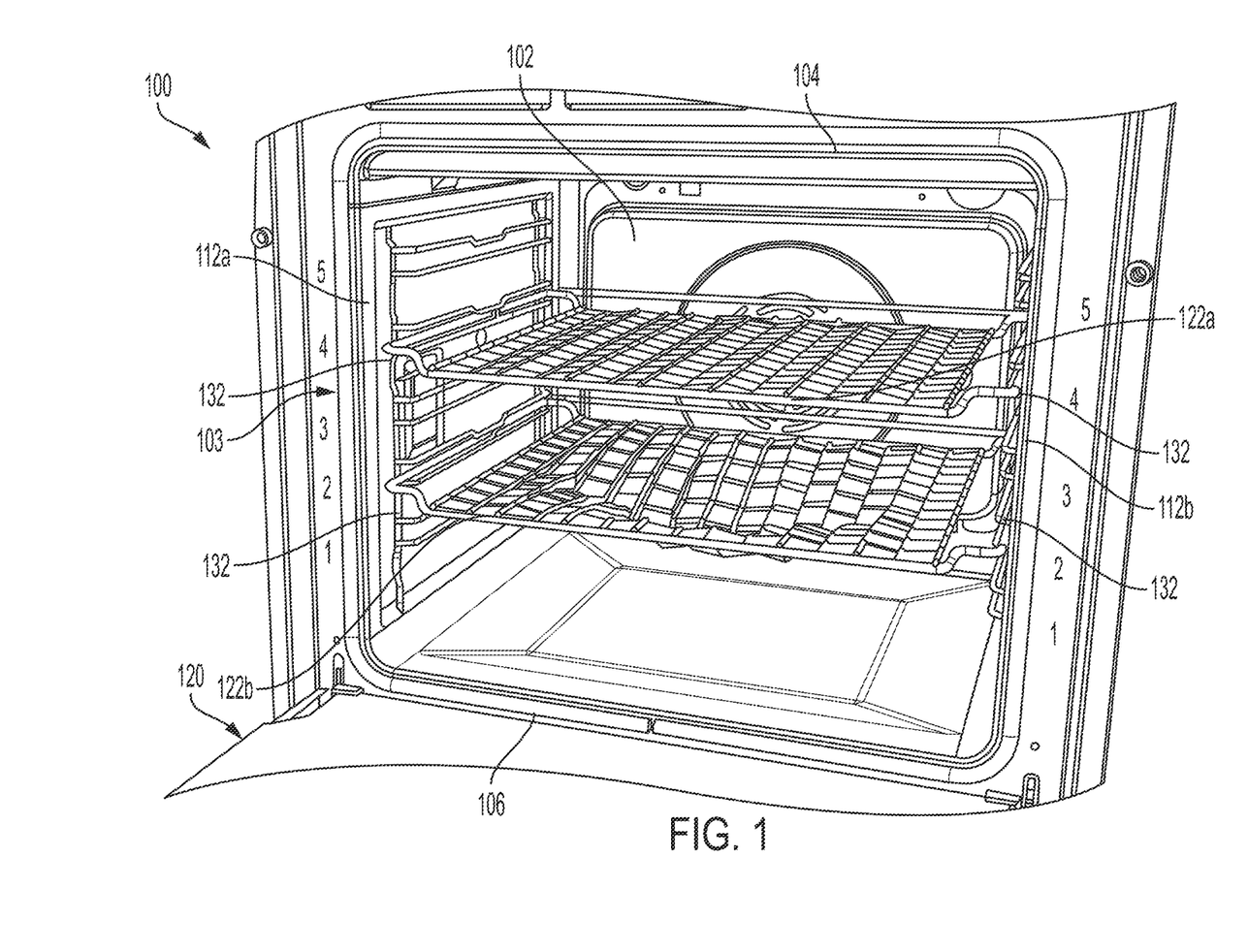
FIG. 1 illustrates an example front perspective view of an oven in accordance with one example embodiment.

FIG. 1 illustrates an example front perspective view of an oven 100 in accordance with one example embodiment. The oven 100 may be any cooking appliance such as a conventional oven, convection oven, microwave oven, toaster oven, as well as function specific ovens such as roaster oven, pizza ovens, etc. The oven 100 may be a standalone oven, a built-in oven, a combination oven and stovetop, etc.

The oven 100 may form a cabinet 103 and define a cavity 102 having a cavity top 104, cavity bottom 106, cavity back 110, a first side wall 112a and a second side wall 112b (collectively referred to herein as "side walls 112"). A door assembly 120 may be hinged at a front of the cavity bottom 106 to permit access to the cavity 102. The door assembly 120 may include a window and a handle and may hermetically seal the cavity when the door is in a closed position. A door sensor may be arranged on the door or the cavity 102 to detect an open and closed position of the door assembly 120.

The cavity 102 may be configured to receive food items for cooking, baking, and/or broiling during a cooking cycle. The cavity 102 may include a temperature sensor for determining the air temperature within the cavity 102 during cooking. The oven 100 may include a controller configured to receive user inputs at a user interface (not shown). The user interface may also provide information to the user such as cook time, temperature, etc.

The oven 100 may include a heating system for heating the cavity 102 during cooking. The heating system may include a heating element such as a gas heating element or an electric heating element. The heating element may be arranged between the cabinet 103 and the cavity back 110 and/or the cavity top 104. The heating element may produce heat and the heat may be forced into the cavity 102 via air passages in the cavity walls 112. The heat may then circulate throughout the cavity 102 to heat and cook the food items therein.

The oven 100 may include one or more rack assemblies 122 within the cavity 102 for supporting the food items during cooking. As shown by way of example in FIG. 1, the oven may include a top rack 122a and a bottom rack 122b (collectively referred to herein as racks 122 or rack assemblies 122). In the examples in FIG. 1, the top rack 122a is illustrated as being in a normal state while the bottom rack 122b is illustrated as being in a deformed state. The rack assemblies 122, as described in more detail herein, are configured to conform or deform when a container is placed thereon. In this example, a container (not shown) has caused the bottom rack 122b to deform. Such an example is described in more detail below.

It should be noted that while two rack assemblies 122 are shown, ovens 100 with more or fewer rack assemblies 122 are possible. Regardless of quantity, the rack assemblies 122 may rest on side rails 132 arranged along the side walls 112. The side rails 132 may extend parallel or generally parallel with the cavity top 104 and cavity bottom 108 along the side walls 112 at spaced intervals. The side rails 132 may extend up the height of the side walls 112 to allow for varying positions of the racks 122 within the cavity 102. For each rail 132 arranged on the first side wall 112a, a corresponding rail 132 is arranged on the opposite second side wall 112b (generally at the same relative height) so that the rack assembly 122 may be evenly maintained on each side thereof.

Figure 2:
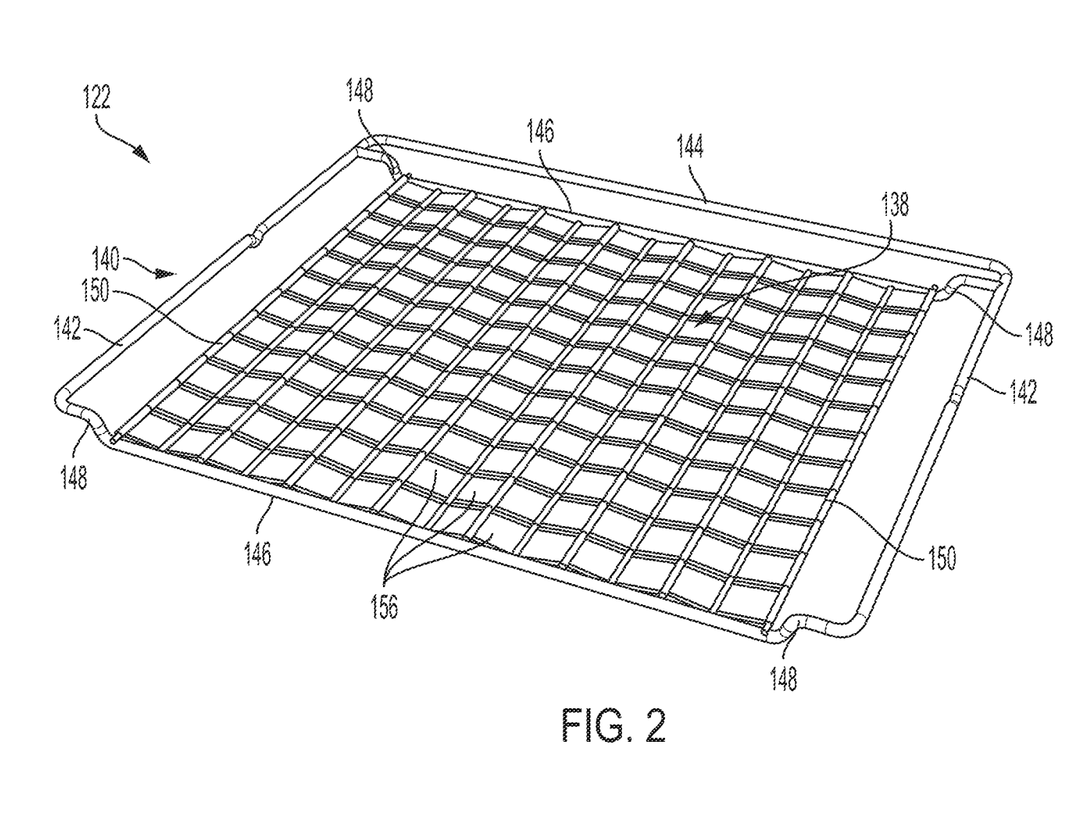
FIG. 2 illustrates a perspective view of the rack assembly of FIG. 1.

FIG. 2 illustrates a perspective view of the rack assembly 122 of FIG. 1. The rack assembly 122 may include a frame 140 configured to engage with each side of the oven 100 during use. The frame 140 may include various supports forming a quadratic shape, including a pair of side supports 142 spaced and parallel to one another. The side supports 142 may be configured to engage with the rails of the oven 100, as discussed and illustrated above with respect to FIG. 1. The frame 140 further includes a rear support 144 extending between the side supports 142. Additionally or alternatively, the rear support 144 may also engage with a rail at the back of the oven 100.

A pair of mesh supports 146 are arranged between the side supports 142 where the mesh supports 146 form right angles with the side supports 142 and complete the quadratic shape of the frame 140. The mesh supports 146 may form a bend 148 at each end of the support. This bend 148 may allow for the mesh supports 146 to be vertically offset from the side supports 142. In the example shown in the figures, the mesh supports 146 are vertically offset to a lower position than the side supports 142 and rear support 144 when in an installed position in the oven 100.

The mesh 138 may extend between the mesh supports 146 and the side supports 142. The mesh 138 forms a quadratic shape having four sides. A pair of bars 150 may extend between the mesh supports 146. The bars 150 extend from one of the mesh supports 146 to the other to support the mesh at two sides of the mesh while the mesh supports support the mesh 138 at the other two sides of the mesh 138. The bars 150 may rest or attach to the mesh supports 146 at the bends 148. The bends 148 may, at least in part, provide a location reference for the mesh 138 to be placed.

The mesh 138 may provide for a flexible rack or tray to place food items and containers on. The mesh 138 may be rigid enough to hold the item, but flexible enough to generally conform to the shape of the item.

Figure 3A:
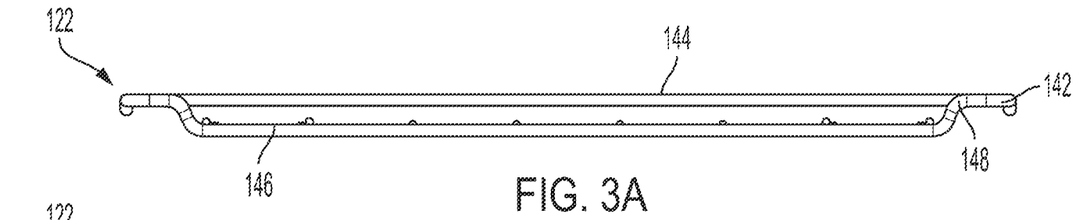
FIG. 3A illustrates a front view of the rack assembly in a normal state where no item is placed on the mesh.

FIG. 3A illustrates a front view of the rack assembly 122 in a normal state where no item is placed on the mesh 138. In this example, the mesh 138 maintains a relatively flat and rigid surface, similar to a traditional oven rack.

Figure 3B:
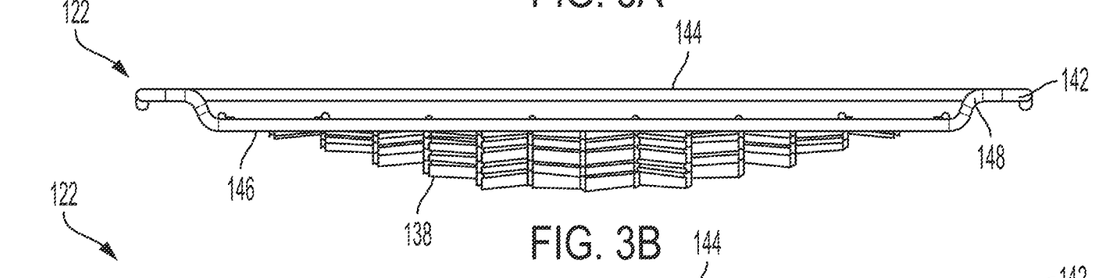
FIG. 3B illustrates a front view of the rack assembly in a flexible state where an item may be placed on the mesh having a first shape.

FIG. 3B illustrates a front view of the rack assembly in a flexible state where an item may be placed on the mesh 138 having a first shape. The mesh 138 may conform to the item's shape.

Figure 3C:
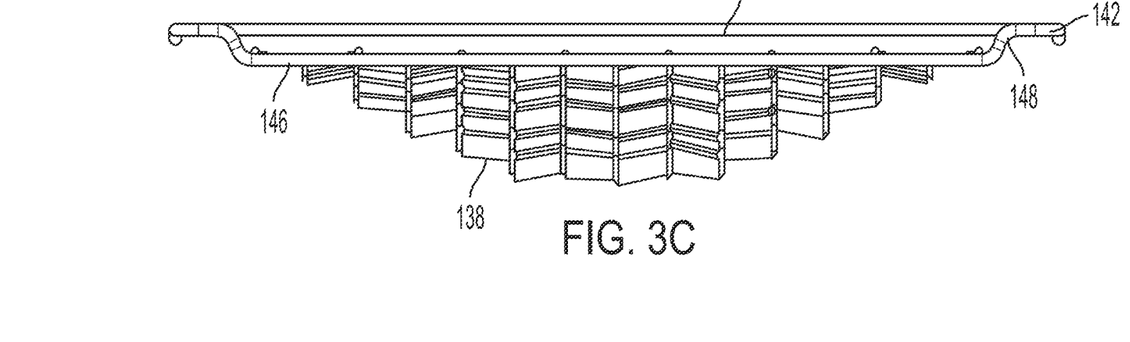
FIG. 3C illustrates a front view of the rack assembly in another flexible state where an item may be placed on the mesh having a second shape.

FIG. 3C illustrates a front view of the rack assembly 122 in another flexible state where an item may be placed on the mesh 138 having a second shape. When compared to the first shape of FIG. 3B, the item having a second shape in FIG. 3C may have a larger shape than that of the item in FIG. 3B. The weight of the item or container may also affect the deformation of the mesh 138.

Returning to FIG. 2, the mesh 138 may be formed from a plurality of panels 156. The panels 156 may be hinged panels configured to hinge with respect to the next panel in response to an item or container being placed on the mesh 138.

The frame 140 may be formed of rigid metallic wire and may include a rotation safe block and sliding stop. The side supports 142, rear support 144, and mesh supports 146 may all be a single piece. Additionally or alternatively, these components may be separate but fixed to one another. In one example, these components are all of the same diameter, where the bars 150 may be a smaller diameter or a different gauge. Alternatively, the bars 150 may be of the same diameter as the supports.

Figure 4:
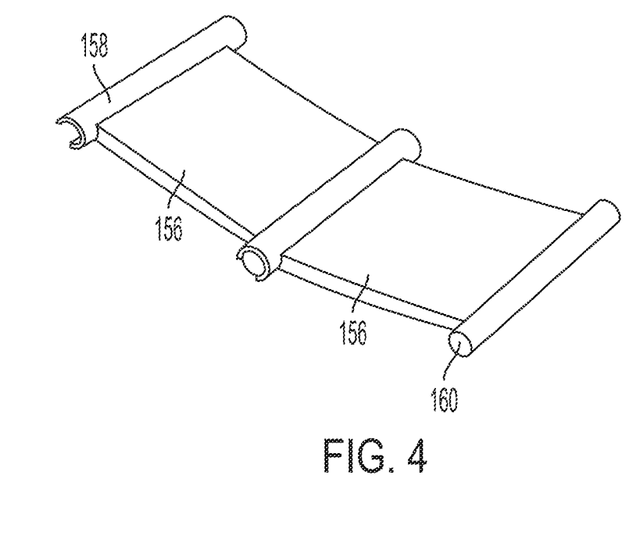
FIG. 4 illustrates a perspective view of a panels of FIG. 2.

FIG. 4 illustrates a perspective view of two of the panels 156 of FIG. 2. Each panel 156 may form a quadratic shape. The panels 156 may each include a channel 158 on one side. The channel 158 may define an elongated opening along the entire channel 158. On the other opposite side, the panel 156 may include a rod 160. The rod 160 may extend the entire side, or at least along a portion of the side of the panel 156. The channel 158 of one panel 156 is configured to receive the rod 160 of an adjacent panel 156, the rod 160 configured to rotate within the channel 158 to allow the one panel 156 to hinge with respect to the adjacent panel 156. As shown, the rod 160 of one of the panes is received into the channel 158 of the other illustrated panel 156.

Figure 5:
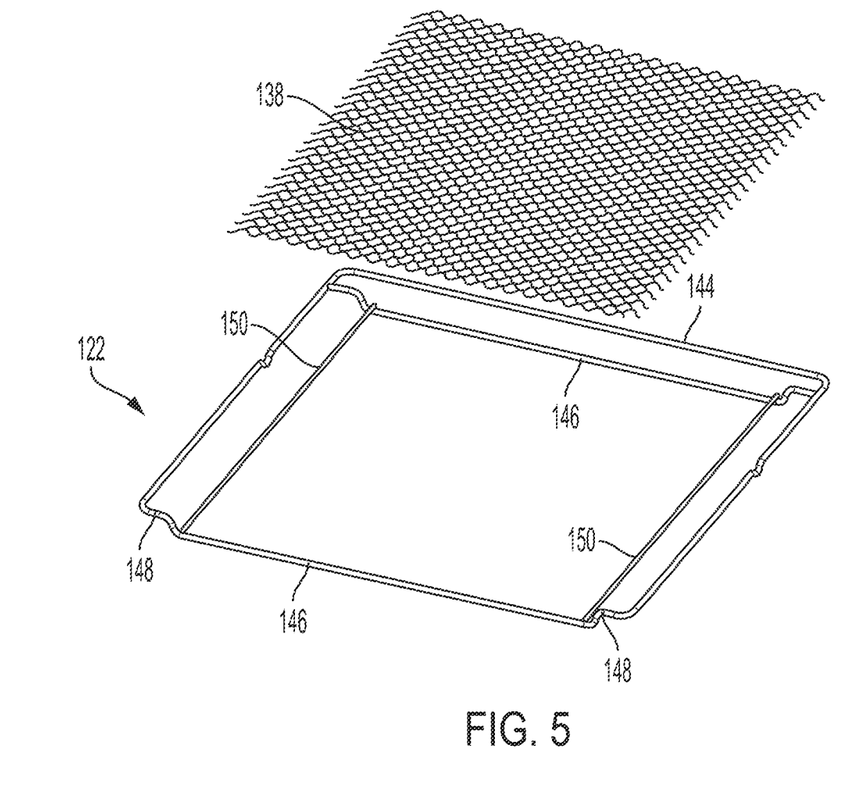
FIG. 5 illustrates an exploded view of the rack assembly having another example mesh.

FIG. 5 illustrates an exploded view of the rack assembly 122 having another example mesh 138. In this example, the mesh 138 comprises a plurality of wires. These wires may be harmonic steel wires configured to form a rhomboid interlaced structure. The wires intertwine and rotate at intersection points. These intersection points act as a hinge. Due to the flexibility of the harmonic steel wires, the wires may also deform, adopting to the weight of the load.

Figure 6:
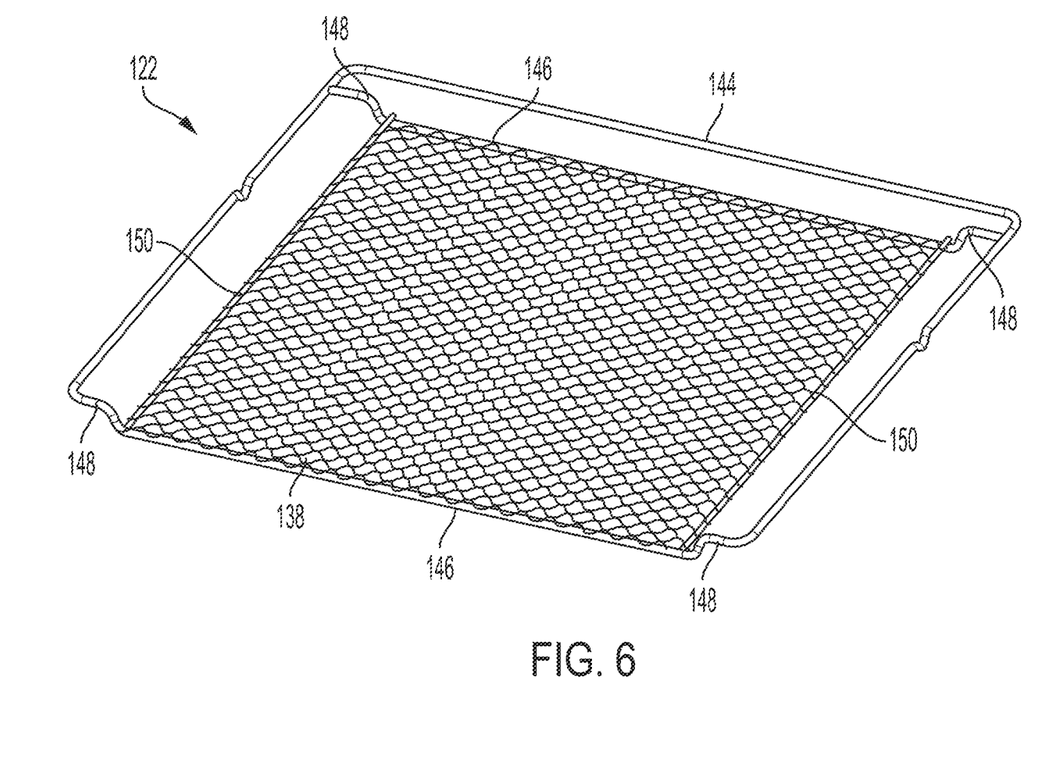
FIG. 6 illustrates a perspective view of the rack assembly of FIG. 5.

FIG. 6 illustrates a perspective view of the rack assembly 122 of FIG. 5. Similar to FIG. 2, the rack assembly 122 may include the frame 140 configured to engage with each side of the oven 100 during use. The frame 140 may include the side supports 142 spaced and parallel to one another. The side supports 142 may be configured to engage with the rails of the oven 100, as discussed and illustrated above with respect to FIG. 1. The frame 140 further includes the rear support 144 extending between the side supports 142. Additionally or alternatively, the rear support 144 may also engage with the rail at the back of the oven 100.

The mesh supports 146 are arranged between the side supports 142 where the mesh supports 146 form right angles with the side supports 142 and complete the quadratic shape of the frame 140. The mesh supports 146 may form the bends 148 at each end of the supports 146. These bends 148 may allow for the mesh supports 146 to be vertically offset from the side supports 142. In the example shown in the figures, the mesh supports 146 are vertically offset to a lower position than the side supports 142 and rear support 144 when in an installed position in the oven 100.

The mesh 138 may extend between the mesh supports 146 and the side supports 142. The mesh 138 forms a quadratic shape having four sides. A pair of bars 150 may extend between the mesh supports 146. The bars 150 extend from one of the mesh supports 146 to the other to support the mesh at two sides of the mesh while the mesh supports support the mesh 138 at the other two sides of the mesh 138. The bars 150 may rest or attach to the mesh supports 146 at the bends 148. The bends 148 may, at least in part, provide a location reference for the mesh 138 to be placed.

The mesh 138 may provide for a flexible rack or tray to place food items and containers on. The mesh 138 may be rigid enough to hold the item, but flexible enough to generally conform to the shape of the item.

As explained, the frame 140 may be formed of rigid metallic wire and may include a rotation safe block and sliding stop. The side supports 142, back support 144, and mesh supports 146 may all be a single piece. Additionally or alternatively, these components may be separate but fixed to one another. In one example, these components are all of the same diameter, where the bars 150 may be a smaller diameter or a different gauge. Alternatively, the bars 150 may be of the same diameter as the supports.

Figure 7:
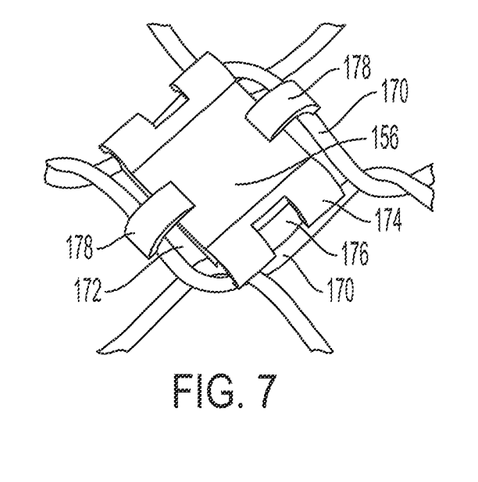
FIG. 7 illustrates a partial perspective view of the mesh of FIG. 6 including a panel arranged within an opening of the mesh.

FIG. 7 illustrates a partial perspective view of the mesh 138 of FIG. 6 including a panel 156 arranged within an opening of the mesh 138. As explained above, the mesh 138 includes a plurality of intertwining wires 170 forming the rhomboid mesh forming a plurality of rhomboid openings 172 between the wires 170. The size of the rhomboid openings 172 may vary in some cases, or the openings 172 may be generally uniform as illustrated in FIGS. 6 and 7. In some examples, the rhomboid openings 172 may be configured to receive a panel 156 to add additional structure to the mesh 138.

The panel 156 may be configured to attach to the wires 170 and fit within or on a respective opening 172. In the example of FIG. 7, the panels 156 may form a quadratic shape configured to fit within the rhomboid openings 172. The panels 156 may be made of a heat resistant material such as silicone, though other materials may be contemplated. The panel 156 may include at least one channel 174 configured to engage with a portion of the wire 170 to secure the panel 156 to the wire 170. The channel 174 may define a channel opening 176. The channel 174 may be curved and configured to receive the portion of the wire 170 under the curved portion such that the channel 174 may rest on the wire 170.

The panel 156 may also include a prong 178 extending from one of the sides and configured to engage with the wire 170 to further secure the panel to the wire 170. The prong 178 may be curved and configured to receive the portion of the wire 170 under the curved portion such that the prong 178 may 'rest' on the wire 170, similar to the channel 174.

Each panel 156 may include a pair of prongs 178 on opposite sides of the panel 156 and a pair of channels 174 on the other of the sides. The channels 174 may extend the length of the side of the panel 156 and the channel opening 176 may be defined in the center of the channel 174. When installed on the mesh 138, the channels 174 may be configured to receive the prong 178 of the adjacent panel 156 such that the panel 156 and the adjacent panel 156 each engage the same portion of wire 170.

Figure 8:
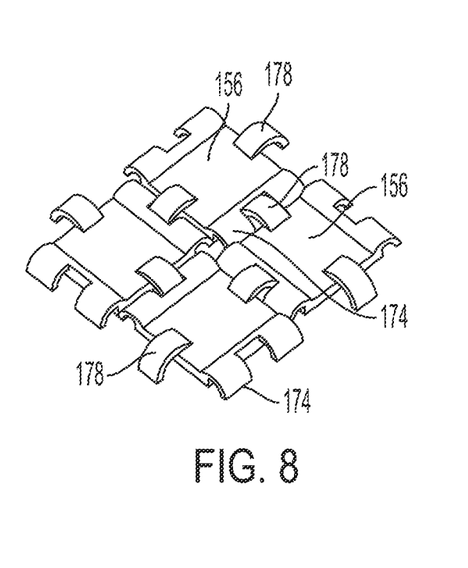
FIG. 8 illustrates a plurality of panels of the mesh in interlocking arrangement in the installed state.

FIG. 8 illustrates a plurality of panels 156 of the mesh 138 in an interlocking arrangement in the installed state. In this installed state, the channels 174 receive the prong 178 of the adjacent panel 156 such that the panel 156 and the adjacent panel 156 each engage the same portion of wire 170. In this arrangement, each of the panels 156 may hinge about the wire 170 to create a rigid but flexible configuration in order to receive and deform with a container.

Notably, in some examples, the mesh 138 may be removable from the frame 140 and stored separately from the frame 140. This may allow the user to selectively install one of a plurality of meshes depending on the user's preferred cooking method or feature. The frame 140 may be configured to support various examples of meshes, including the example in FIG. 2, and FIG. 6. Alternatively, the mesh 138 may be fixed to the frame 140 and removable as an integrated part with the frame 140.

Accordingly, an oven rack assembly is described herein having a flexible mesh base configured to conform to a container. This allows an oven to include more cooking features antimachinists and avoid the space taking special purpose appliances such as air fryers, sous vides, etc. The mesh is support on a rigid frame and may include panels, and/or intertwining wires. The mesh may form and deform according to the items placed thereon. During non-use the mesh or the rack assembly may be easily stored so as to save space.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An accessory for an oven, comprising:
a frame configured to engage with each side of the oven during use, the frame forming a pair of side supports spaced and parallel to one another and each of the pair of side supports configured to engage with a rail of the oven on the respective side of the oven, a pair of mesh supports spaced and parallel to one another and each of the pair of mesh supports extending between the side supports;
a mesh attached to the mesh supports and including a plurality of hinged panels configured to hinge with respect to the next panel in response to a container being placed on the mesh to allow the mesh to conform to the shape of the container.

2. The accessory of claim 1, wherein the mesh supports define a bend at each end to vertically offset the mesh supports from the side supports.

3. The accessory of claim 2, wherein the mesh forms a quadratic shape having four sides.

4. The accessory of claim 3, further comprising a pair of bars, each extending from one of the mesh supports to the other to support the mesh at two sides of the mesh while the mesh supports support the mesh at the other two sides of the mesh.

5. The accessory of claim 4, wherein the bars extend between the mesh supports at the bend at each end of the mesh supports.

6. The accessory of claim 1, wherein each of the panels form a quadratic shape and include a channel on one side and a rod on the opposite side, wherein the channel of one panel is configured to receive the rod of an adjacent panel, the rod configured to rotate within the channel to allow the one panel to hinge with respect to the adjacent panel.

7. The accessory of claim 1, wherein the mesh includes a plurality of intertwining wires creating a rhomboid mesh forming a plurality of rhomboid openings between the wires.

8. The accessory of claim 7, wherein each of the panels form a quadratic shape configured to fit within the rhomboid openings and include at least one channel configured to engage with a portion of the wire to secure the panel to the wire.

9. The accessory of claim 8, wherein each of the panels include at least one prong configured to engage with the wire to secure the panel to the wire.

10. The accessory of claim 9, wherein each of the panels include a pair of prongs on opposite sides of the panel and a pair of channels on the other of the sides, each channel defining an opening configured to receive the prong of an adjacent panel such that the panel and the adjacent panel each engage the same portion of wire.

11. An accessory for a cooking appliance, comprising:
a frame configured to engage with each side of the cooking appliance during use, the frame forming a pair of side supports spaced and parallel to one another and each of the pair of side supports configured to engage with a rail of the cooking appliance on the respective side of the oven, and a pair of mesh supports spaced and parallel to one another and each of the pair of mesh supports extending between the side supports; and
a mesh attached to the mesh supports and including a plurality of hinged panels configured to hinge with respect to the next panel so that the mesh is configured to flexibly conform to a shape of a container placed thereon.

12. The accessory of claim 11, wherein the mesh includes a plurality of wires intertwined to form rhomboid openings between the wires.

13. The accessory of claim 12, wherein the plurality of hinged panels are configured to be received within the rhomboid openings.

14. The accessory of claim 13, wherein the panels are formed of silicone.

15. The accessory of claim 13, wherein the panels form a quadratic shape to mimic the rhomboid openings, wherein one pair of opposite sides include prongs configured to engage the wire in an installed state.

16. The accessory of claim 15, wherein the other pair of opposite sides of the panels include a channel having an opening, wherein the channel is configured to engage another portion of the wire in the installed state, wherein the opening is configured to receive the prong of an adjacent panel such that the panel and the adjacent panel engage the same portion of the wire.

17. The accessory of claim 11, wherein the mesh supports define a bend at each end to vertically offset the mesh supports from the side supports.

18. The accessory of claim 17, wherein the mesh forms a quadratic shape having four sides.

19. The accessory of claim 18, further comprising a pair of bars, each extending from one of the mesh supports to the other to support the mesh at two sides of the mesh while the mesh supports support the mesh at the other two sides of the mesh.

20. The accessory of claim 11, wherein each of the panels form a quadratic shape and include a channel on one side and a rod on the opposite side, wherein the channel of one panel is configured to receive the rod of an adjacent panel, the rod configured to rotate within the channel to allow the one panel to hinge with respect to the adjacent panel.

\* \* \* \* \*